(12) United States Patent
Adams et al.

(10) Patent No.: US 12,024,088 B2
(45) Date of Patent: *Jul. 2, 2024

(54) LIGHTING SYSTEM FOR VEHICLE CUPHOLDER WITH INDUCTIVE POWER COUPLING AND RELATED METHODS

(71) Applicant: Voxx International Corporation, Hauppauge, NY (US)

(72) Inventors: John Adams, Pinehurst, NC (US); Jason Gossiaux, Leander, TX (US); Mangesh Vinayak Soman, South Lyon, MI (US); Doug Kline, Warren, MI (US); Jonathan Grasso, Clinton Township, MI (US); Steven Young, Ypsilanti, MI (US); Nelson Phan, Rochester Hills, MI (US)

(73) Assignees: VOXX INTERNATIONAL CORPORATION, Hauppauge, NY (US); NISSAN NORTH AMERICA, INC., Franklin, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/334,564

(22) Filed: Jun. 14, 2023

(65) Prior Publication Data
US 2024/0140307 A1 May 2, 2024

Related U.S. Application Data

(63) Continuation-in-part of application No. 17/976,322, filed on Oct. 28, 2022, now Pat. No. 11,752,934.
(Continued)

(51) Int. Cl.
*B60Q 3/225* (2017.01)
*H02J 50/00* (2016.01)
(Continued)

(52) U.S. Cl.
CPC ............ *B60Q 3/229* (2022.05); *H02J 50/005* (2020.01); *H02J 50/10* (2016.02); *H05B 47/19* (2020.01); *F21V 23/04* (2013.01)

(58) Field of Classification Search
CPC .................................. B60Q 3/229; H02J 50/10
See application file for complete search history.

(56) References Cited

U.S. PATENT DOCUMENTS 10,173,571 B2    1/2019   Park et al.
10,386,566 B2 *  8/2019   Ueno ................... B60N 3/101
(Continued)

FOREIGN PATENT DOCUMENTS

CN    104930409    9/2015
CN    105263752    10/2018
(Continued)

*Primary Examiner* — Christopher E Dunay
(74) *Attorney, Agent, or Firm* — ALLEN, DYER, DOPPELT, + GILCHRIST, P.A.

(57) ABSTRACT

A lighting system may be for a vehicle cup holder installed in a vehicle. The lighting system may include a first inductive member to be positioned adjacent a back side of the vehicle cup holder, and a first controller configured to inductively couple power and command signals through the first inductive member. The lighting system may also include a lighting device to be positioned adjacent a front side of the vehicle cup holder. The lighting device, in turn, may include a second inductive member configured for inductive coupling with the first inductive member, at least one light, and a second controller configured to operate the at least one light based upon power and command signals inductively coupled to the second inductive member from the first inductive member.

25 Claims, 4 Drawing Sheets

Related U.S. Application Data

(60) Provisional application No. 63/478,391, filed on Jan. 4, 2023.

(51) Int. Cl.
*H02J 50/10* (2016.01)
*H05B 47/19* (2020.01)
*F21V 23/04* (2006.01)

(56) References Cited

U.S. PATENT DOCUMENTS

| | | | |
|---|---|---|---|
| 2015/0042223 A1* | 2/2015 | Harrington | B63B 45/00 |
| | | | 315/70 |
| 2015/0136932 A1* | 5/2015 | Salter | B60Q 3/20 |
| | | | 248/346.05 |
| 2015/0251584 A1 | 9/2015 | Deyaf | |
| 2015/0257242 A1 | 9/2015 | Deyaf | |
| 2016/0185289 A1 | 6/2016 | Shibata et al. | |
| 2016/0200244 A1 | 7/2016 | Salter et al. | |
| 2016/0344221 A1* | 11/2016 | Kramer | H02J 7/0044 |
| 2019/0135174 A1 | 5/2019 | Brown | |
| 2020/0036228 A1* | 1/2020 | Simpson | H01F 38/14 |
| 2020/0343773 A1 | 10/2020 | Tsai et al. | |
| 2021/0094455 A1* | 4/2021 | Vite Cadena | B60N 3/103 |

FOREIGN PATENT DOCUMENTS

| | | |
|---|---|---|
| DE | 102013222889 | 5/2015 |
| DE | 102019106409 | 9/2020 |
| EP | 2827250 | 1/2015 |
| EP | 3674134 | 7/2020 |
| JP | 6182010 | 8/2017 |
| RU | 2627681 | 8/2017 |
| RU | 2658331 | 6/2018 |
| RU | 2684403 | 4/2019 |
| WO | 2014165597 | 10/2014 |

\* cited by examiner

LIGHTING SYSTEM FOR VEHICLE CUPHOLDER WITH INDUCTIVE POWER COUPLING AND RELATED METHODS

RELATED APPLICATIONS

This application is a continuation-in-part of U.S. application Ser. No. 17/976,322 filed Oct. 28, 2022, and also claims the benefit of U.S. provisional application Ser. 63/478,391 filed Jan. 4, 2023, which are hereby incorporated herein in their entireties by reference.

FIELD OF THE INVENTION

The invention relates to vehicle equipment, and, more particularly, to inductive lighting for vehicles.

BACKGROUND

Attractive interior vehicle lighting may be an important user preference feature, and, accordingly, an important sales feature. Vehicle interior lighting may also be helpful to locate items within the vehicle. Moreover, vehicle interior lighting may also set a more pleasing ambiance for the vehicle.

Many modern vehicles are equipped with interior lighting for foot wells, door pockets, the overhead console, the dashboard, etc. A typical vehicle includes a vehicle cup holder, such as installed at the factory between the driver and passenger. The cup holder is typically a molded plastic piece that defines, one, two, or more cylindrical openings to receive a beverage cup.

Despite efforts to improve the extent of and attractiveness of interior vehicle lighting, there still exists a need for further improvements. This is particularly so for a vehicle cup holder.

SUMMARY OF THE INVENTION

In general, a lighting system may be for a vehicle cup holder installed in a vehicle, and the lighting system may comprise a first inductive member to be positioned adjacent a back side of the vehicle cup holder, and a first controller configured to inductively couple power and command signals through the first inductive member. The lighting system may also include a lighting device to be positioned adjacent a front side of the vehicle cup holder. The lighting device, in turn, may comprise a second inductive member configured for inductive coupling with the first inductive member, at least one light, and a second controller configured to operate the at least one light based upon power and command signals inductively coupled to the second inductive member from the first inductive member.

In some embodiments, the at least one light comprises at least one light having a controllable color, and the command signals may comprise color command signals. Alternatively or in addition, the at least one light may comprise at least one light having a controllable intensity, and the command signals may comprise intensity command signals. The power and command signals may comprise a power signal and at least one command signal modulated thereon, for example.

The lighting device may comprise a water-resistant housing containing the second inductive member and second controller. In some embodiments, the water-resistant housing may comprise a bottom, and a translucent cover coupled to the bottom. In another embodiment, the water-resistant housing may comprise a translucent bottom, and an opaque cover coupled to the translucent bottom so that a peripheral ring thereof is exposed.

The lighting system may also include a user input switch coupled to the first controller to operate the at least one light. The lighting system may also additionally or alternatively comprise a wireless receiver coupled to the first controller and responsive to a wireless user device.

The first inductive member may comprise a first coil. In addition, the second inductive member may comprise a second coil.

Another aspect is directed to a method for lighting a vehicle cup holder installed in a vehicle, the method may comprise positioning a first inductive member adjacent a back side of the cup holder, and coupling a first controller to the first inductive member to inductively couple power and command signals therethrough. The method may also comprise positioning a lighting device adjacent a front side of the vehicle cup holder. The lighting device may comprise a second inductive member configured for inductive coupling with the first inductive member, at least one light, and a second controller configured to operate the at least one light based on power and command signals inductively coupled to the second inductive member from the first inductive member.

DETAILED DESCRIPTION OF THE EMBODIMENTS

The present description is made with reference to the accompanying drawings, in which exemplary embodiments are shown. However, many different embodiments may be used, and thus, the description should not be construed as limited to the particular embodiments set forth herein. Rather, these embodiments are provided so that this disclosure will be thorough and complete. Like numbers refer to like elements throughout. Prime and double prime notation are used in alternative embodiments to indicate similar elements.

Figure 1:
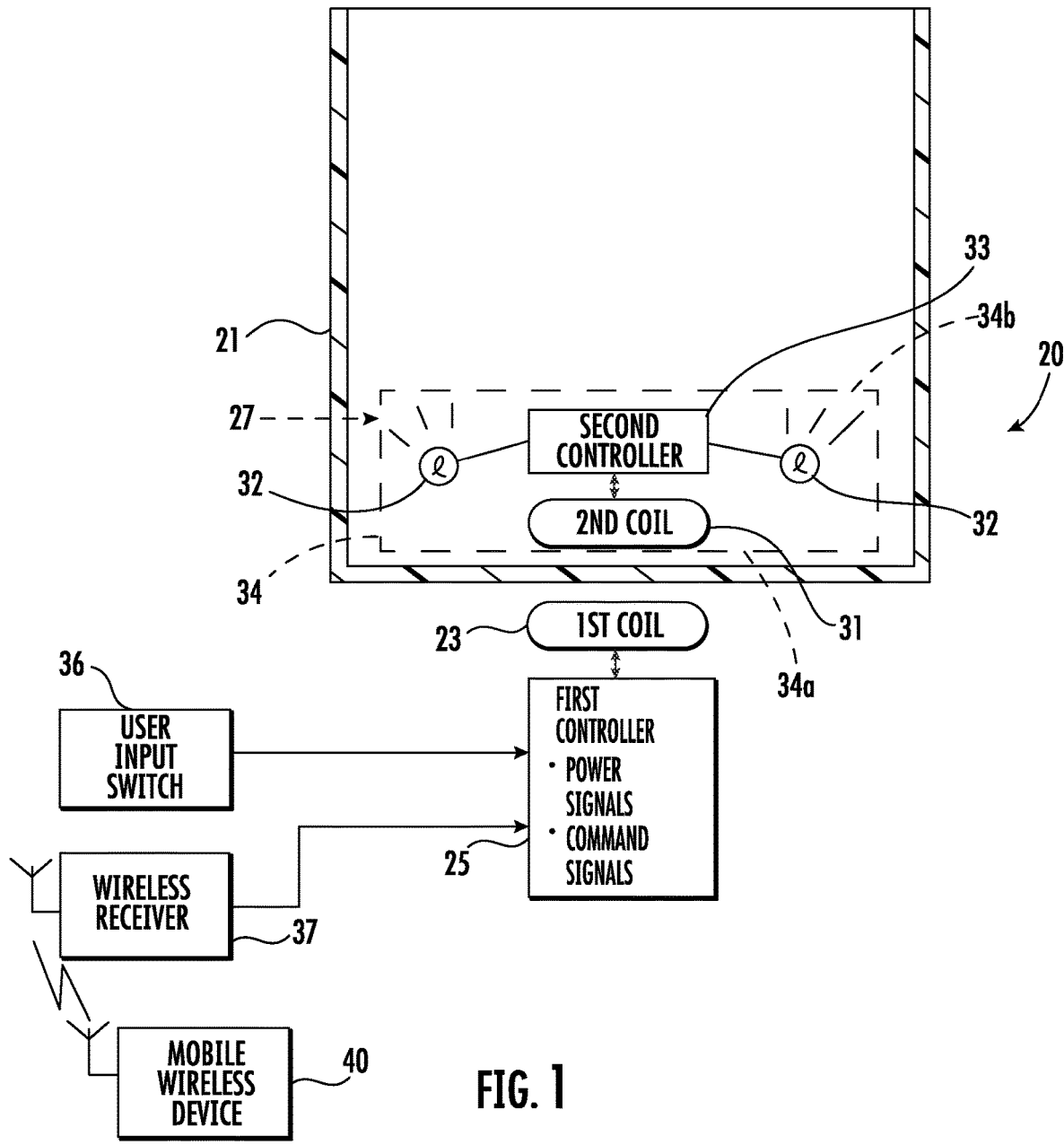
FIG. 1 is a schematic diagram of a lighting system for a vehicle cup holder according to the invention.

Referring now to FIG. 1, a lighting system 20 for use in a vehicle, such as in a vehicle cup holder 21 is now described. The vehicle cup holder 21 is typically positioned within a vehicle between the driver and passenger seats, but could be used in other positions within the vehicle as well. The lighting system 20 includes a first inductive member in the illustrated form of a first coil 23 positioned adjacent a back side of the vehicle cup holder 21. A first controller 25 is coupled to the first coil 23 and is configured to inductively couple power signals and command signals through the first coil.

The lighting system 20 also includes a lighting device 27 positioned adjacent a front side of the vehicle cup holder 21. In other words, the lighting device 27 may be considered as a lighted coaster within the cup holder 21. The lighting device 27 comprises a second inductive member in the form of a second coil 31 configured for inductive coupling with the first coil 23. The lighting device 27 also includes at least one light 32, and a second controller 33 configured to operate the at least one light based upon power signals and command signals inductively coupled to the second coil from the first coil 23.

The lighting device 27 may comprise a water-resistant housing 34 containing the second coil 31 and second controller 33. The housing 34 may be a water-resistant housing comprising a bottom 34a, and a translucent cover 34b coupled to the bottom. In other embodiments, the cover 34b need not be translucent, but instead the cover (or other optics such as an optical Diffuser/Homogenizer (DF/HM)) may be configured to provide homogenized and/or diffuse lighting, as will be appreciated by those skilled in the art.

In some embodiments, the at least one light 32 comprises one or more lights, such as LEDs, having a controllable color, and the command signals may comprise color command signals. Alternatively or in addition, the light(s) 32 may have a controllable intensity, and the command signals may comprise intensity command signals. The at least one light 32 may be provided by 4-6 LEDs per cup holder position, for example. The LEDs may provide 20 preset color options that are changed via command signals on the inductive interface. In accordance with another example implementation, one or more RGB and/or monochrome lighting sources may be used.

The power signals and command signals may comprise a power signal and at least one command signal modulated thereon, for example, as will be appreciated by those skilled in the art. The power signals inductively provide power to the second controller 33 and lights 32. The command signals selectively control the appearance of the lights 32. In other words, the lighting system 20 provides an inductively powered automotive ambient lighting approach that can transmit power along with data for color change, change in intensity, dimming and/or cross-fade for RGB and white LEDs, for example.

The lighting system 20 may also include a user input switch 36 coupled to the first controller 25 to operate the at least one light 32 of the lighting device 27. The lighting system may also additionally, or alternatively, comprise a wireless receiver 37 coupled to the first controller 25 and responsive to a wireless user device, such as the illustrated mobile wireless device 40. The switch 36 or mobile wireless device 40 (e.g., a smartphone running a lighting control app) may be used to turn the lighting device 27 on or off, to control the intensity, and/or to select a color of the lights 32. The wireless receiver 37 and mobile wireless device 40 may operate over a Bluetooth link, for example, although other suitable wireless formats (WiFi, UWB, etc.) may also be used. In some embodiments, the wireless receiver 37 may communicate with the electronic control unit (ECU) of the vehicle, which may receive user input from the switch 36 or an external control interface to the vehicle, as will be appreciated by those skilled in the art.

With the use of inductively coupled power signals and command signals in the lighting system 20, the need for drilling holes to route wiring and lighting is eliminated. Other issues with commonly used wired approaches, such as wire attachment, and connector limitations, are also mitigated.

In some implementations, an RFID or NFC chip or tag (not shown) may be incorporated into the lighting device 27, which may store information such as the make, model, color, etc., of the vehicle in which the lighting device is being used. From this, the first controller 25 may select a corresponding lighting profile for the vehicle, such as a default color profile defined for the particular type of vehicle or the particular interior/exterior colors of the vehicle. Such profiles may also include intensity or other lighting characteristics as discussed above. Such default lighting profiles may be stored by the first controller 25 in some embodiments, or downloaded (e.g., via a control app, etc.) responsive to receiving the stored information on the RFID/NFC tag. In embodiments where an RFID/NFC tag is present, the second controller 33 may be configured to receive color, intensity, etc., commands, as discussed further above, from the mobile wireless device 40 via an RFID/NFC communications link.

Figure 2:
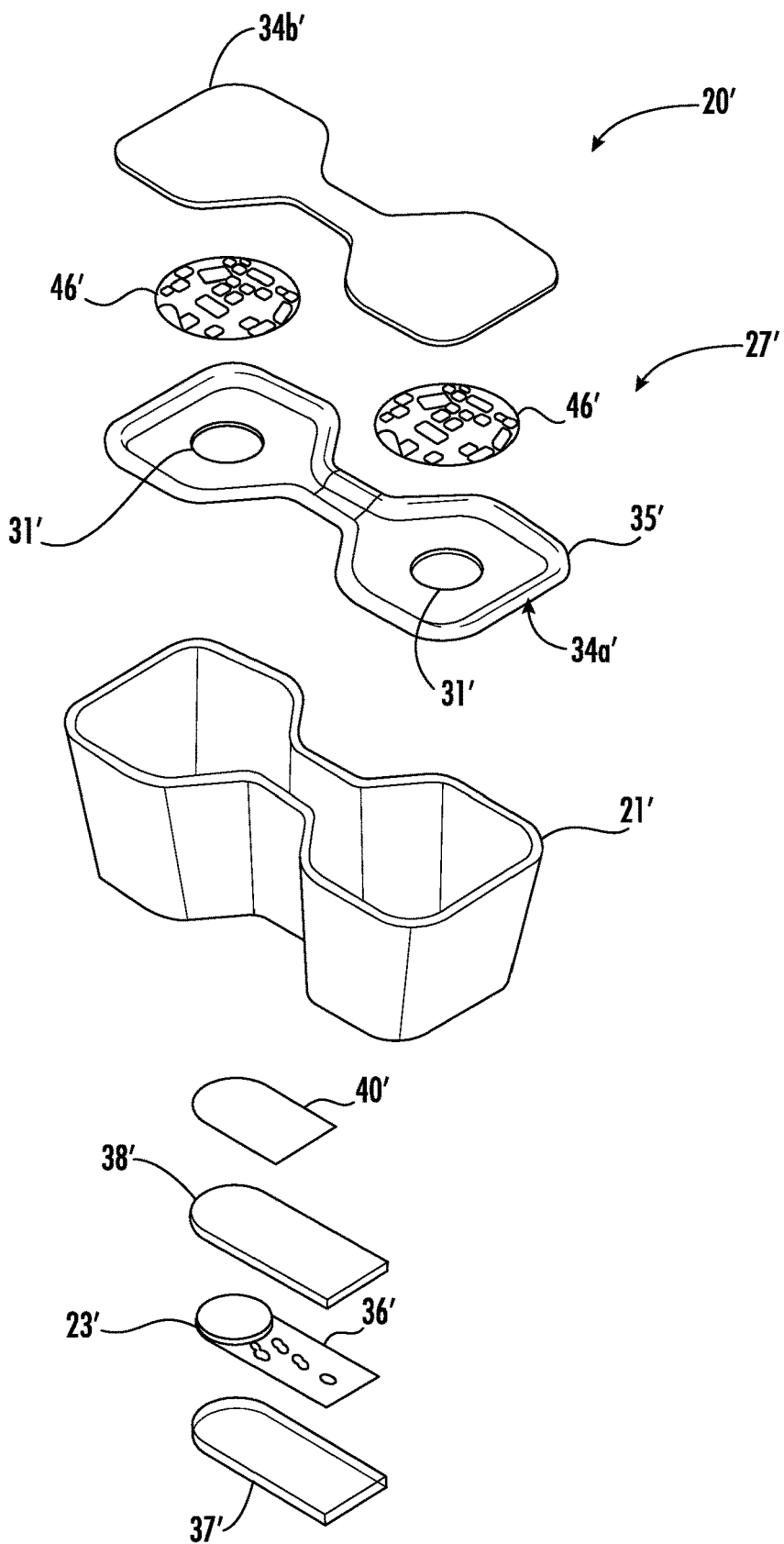
FIG. 2 is an exploded view of another embodiment of a vehicle lighting system for a vehicle cup holder according to the invention.

Turning now to the exploded view of FIG. 2, another embodiment of a lighting system 20' is now described. In this embodiment, the cup holder 21' is in the form of a dual cup holder. The lighting system 20' includes a first inductive member in the form of a wound coil 23' to be positioned adjacent a back side of the vehicle cup holder 21'. The coil 23' is carried by a first printed circuit board (PCB) 36' between a lower housing member 37' and an upper housing member 38'. A piece of die cut adhesive tape 40' is used to secure the upper housing member 38' to the back side of the vehicle cup holder 21'. For clarity of explanation, only a single transmitter assembly including the first coil 23' and printed circuit board 36' is shown, although a second transmitter assembly would be provided in this embodiment to control each side of the dual cup holder 21' independently. In this regard, it should be noted that the lighting system 20' may be further expanded to any or all of the cup holders 21' in a vehicle, and lighting of the various cup holders may be controlled either collectively or individually.

The lighting device 27' includes a water-resistant housing comprising a translucent bottom 34a', and an opaque cover 34b' coupled to the translucent bottom so that an illuminated peripheral ring 35' thereof is exposed. The second inductive member may comprise a pair of second coils 31' mounted on respective circuit boards 46'. The circuit boards 46' carry the circuitry providing the second controller and the lights. The user input switch 36 and wireless receiver 37 as described above with respect to the lighting system 20 of FIG. 1 may also be used in this embodiment of the lighting system 20'.

Figure 3:
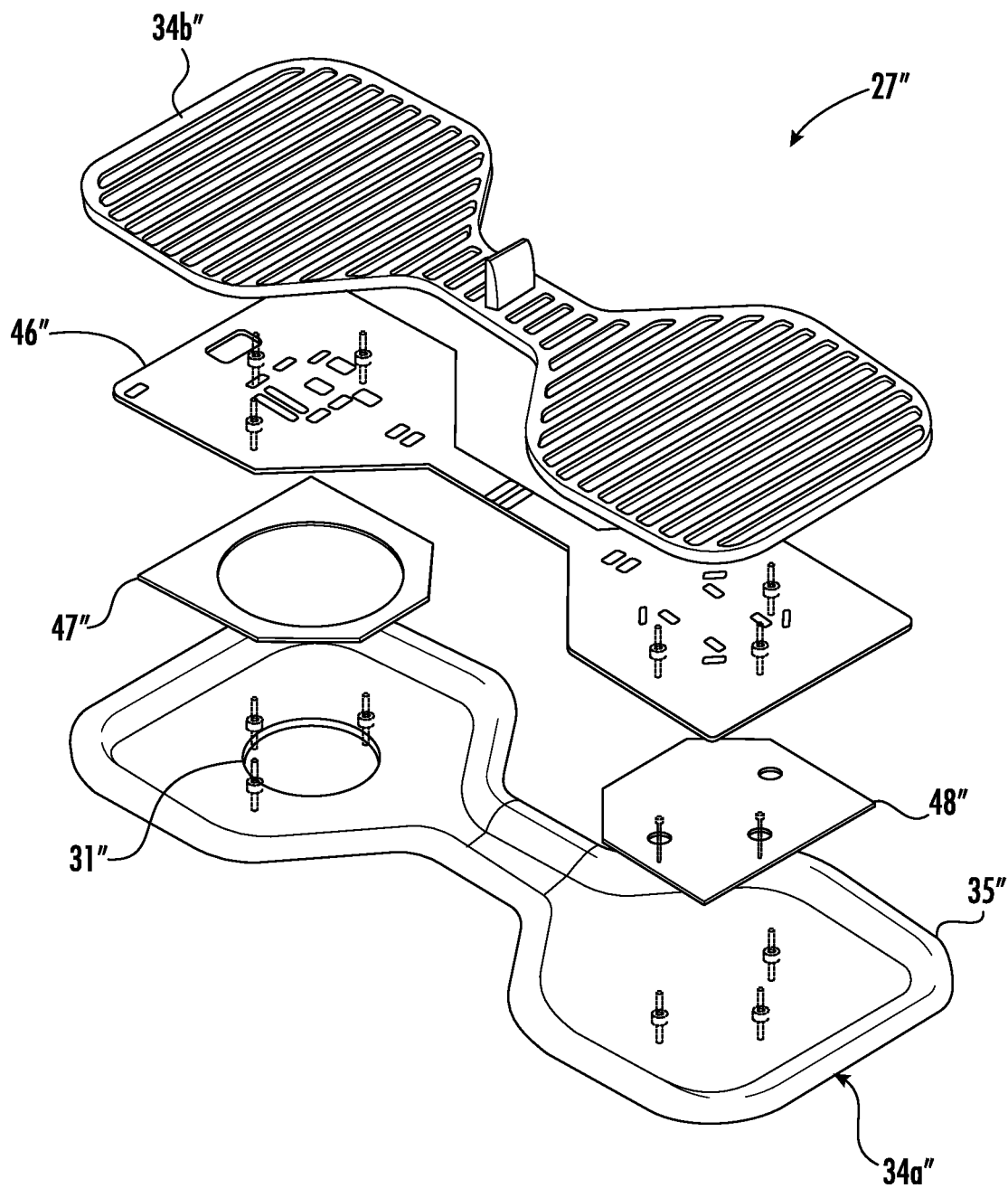
FIG. 3 is an exploded view of a vehicle lighting device for a vehicle lighting system for a vehicle cup holder according to the invention.

Turning now to the exploded view of FIG. 3, another embodiment of a lighting device 27" is now described. In this embodiment, a single circuit board 46" carries the electronics and lights. Also in this embodiment, a single coil 31" is used to provide power signals and command signals as described herein. Spacers 47" and 48" are also provided beneath the circuit board 46".

Figure 4:
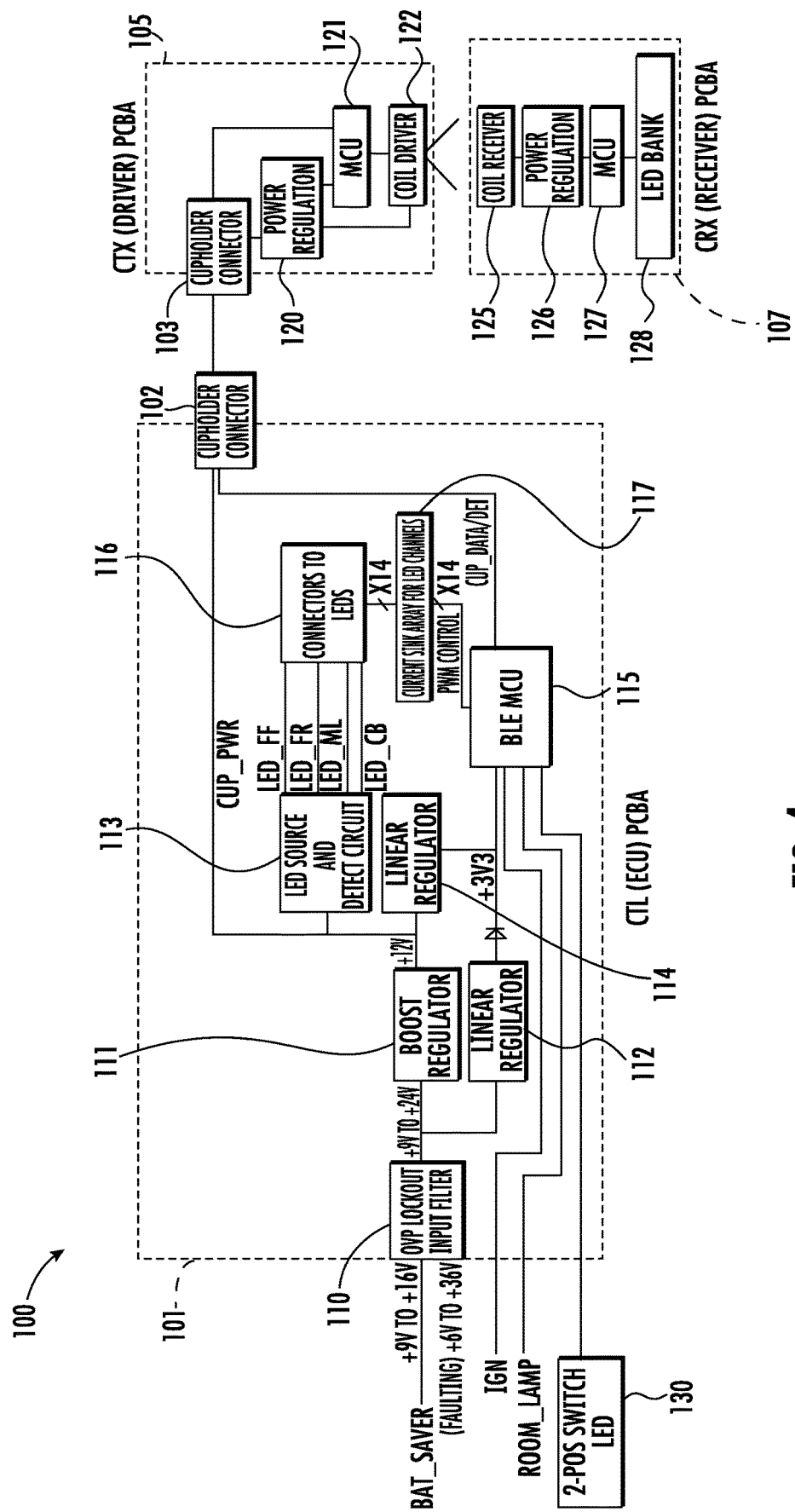
FIG. 4 is a schematic block diagram of circuitry of the lighting system according to the invention.

Additional exemplary circuit details are provided in the schematic block diagram of FIG. 4. The circuitry 100 illustratively includes a control printed circuit board 101 coupled by wired connectors 102 and 103 to a driver printed circuit board 105, which, in turn, is inductively coupled to the receiver printed circuit board 107. The control printed circuit board 101 includes a lockout input filter 110 coupled to a boost regulator 111 and a first linear regulator 112. The boost regulator 111 is coupled to the LED source and detect circuit 113 and a second linear regulator 114. The first and second linear regulators 112 and 114 are coupled to the BLE microcontroller 115, along with a two position switch 130. The BLE microcontroller 115 is coupled to the current sink array for the LED channels circuit 117 which, in turn, is coupled to connectors to LED circuit 116.

The driver circuit board 105 includes a power regulator 120 coupled to a microcontroller 121, which, in turn, is coupled to a coil driver 122. The receiver circuit includes a coil receiver 125 coupled to a power regulator 126, which, in turn is coupled to a microcontroller 127 is coupled to the LED bank 128.

In some embodiments, one or more magnets (not shown) may be incorporated in the housing 34, and a corresponding sensor (e.g., a Hall effect sensor, etc.) may be positioned beneath the cup holder 21 to sense when the housing is properly positioned within the cup holder. In this way, the first controller 25 can prevent energizing of the first coil 23 when the housing 34 is out of the cup holder 21, to thereby conserve power and avoid unnecessary heating of the first coil 23.

Another aspect is directed to a method for lighting a vehicle cup holder installed in a vehicle, the method may comprise positioning a first inductive member adjacent a back side of the cup holder, and coupling a first controller to the first inductive member to inductively couple power and command signals therethrough. The method may also comprise positioning a lighting device adjacent a front side of the vehicle cup holder. The lighting device may comprise a second inductive member configured for inductive coupling with the first inductive member, at least one light, and a second controller configured to operate the at least one light based on power and command signals inductively coupled to the second inductive member from the first inductive member.

It should be noted that, while described with reference to the example implementation of lighting vehicle cup holders 21, the lighting system 20 may also be used in other locations in a vehicle in addition to, or instead of, in vehicle cup holders. For example, the lighting system may similarly be used to light compartments, hatches, window/door trim areas, dashboard areas, etc. As discussed above, the lighting system 20 may be used to light these various areas collectively with the same lighting profile (e.g., color, intensity, etc.), or to allow different lighting profiles for different areas.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

The invention claimed is:

1. A lighting system for a vehicle cup holder installed in a vehicle, the lighting system comprising:
   a first inductive member to be positioned adjacent a back side of the vehicle cup holder;
   a first controller configured to inductively couple power and command signals through the first inductive member; and
   a lighting device to be positioned adjacent a front side of the vehicle cup holder and comprising
      a second inductive member configured for inductive coupling with the first inductive member;
      at least one light; and
      a second controller configured to operate the at least one light based upon power and command signals inductively coupled to the second inductive member from the first inductive member.

2. The lighting system according to claim 1 wherein the at least one light comprises at least one light having a controllable color; and wherein the command signals comprise color command signals.

3. The lighting system according to claim 1 wherein the at least one light comprises at least one light having a controllable intensity; and wherein the command signals comprise intensity command signals.

4. The lighting system according to claim 1 wherein the power and command signals comprise a power signal and at least one command signal modulated thereon.

5. The lighting system according to claim 1 wherein the lighting device comprises a water-resistant housing containing the second inductive member and second controller.

6. The lighting system according to claim 1 wherein the water-resistant housing comprises:
   a bottom; and
   a translucent cover coupled to the bottom.

7. The lighting system according to claim 1 wherein the water-resistant housing comprises:
   a translucent bottom; and
   an opaque cover coupled to the translucent bottom so that a peripheral ring thereof is exposed.

8. The lighting system according to claim 1 comprising a user input switch coupled to the first controller to operate the at least one light.

9. The lighting system according to claim 1 comprising a wireless receiver coupled to the first controller and responsive to a wireless user device.

10. The lighting system according to claim 1 wherein the first inductive member comprises a first coil; and wherein the second inductive member comprises a second coil.

11. A lighting device to be positioned within a vehicle adjacent a front side of a vehicle cup holder installed in the vehicle, the vehicle comprising a first inductive member adjacent a back side of the cup holder and a first controller configured to inductively couple power and command signals through the first inductive member, the lighting device comprising:
   a second inductive member configured for inductive coupling with the first inductive member;
   at least one light; and
   a second controller configured to operate the at least one light based on power and command signals inductively coupled to the second inductive member from the first inductive member.

12. The lighting device according to claim 11 wherein the at least one light comprises at least one light having a controllable color; and wherein the command signals comprise color command signals.

13. The lighting device according to claim 11 wherein the at least one light comprises at least one light having a controllable intensity; and wherein the command signals comprise intensity command signals.

14. The lighting device according to claim 11 wherein the power and command signals comprise a power signal and at least one command signal modulated thereon.

15. The lighting device according to claim 11 comprising a water-resistant housing containing the second inductive member and second controller.

16. The lighting device according to claim 15 wherein the water-resistant housing comprises:
   a bottom; and
   a translucent cover coupled to the bottom.

17. The lighting device according to claim 15 wherein the water-resistant housing comprises:
   a translucent bottom; and
   an opaque cover coupled to the translucent bottom so that a peripheral ring thereof is exposed.

18. The lighting device according to claim 11 wherein the first inductive member comprises a first coil; and wherein the second inductive member comprises a second coil.

19. A method for lighting a vehicle cup holder installed in a vehicle, the method comprising:
- positioning a first inductive member adjacent a back side of the cup holder;
- coupling a first controller to the first inductive member to inductively couple power and command signals therethrough; and
- positioning a lighting device adjacent a front side of the vehicle cup holder, the lighting device comprising
  - a second inductive member configured for inductive coupling with the first inductive member,
  - at least one light, and
  - a second controller configured to operate the at least one light based on power and command signals inductively coupled to the second inductive member from the first inductive member.

20. The method according to claim 19 wherein the at least one light comprises at least one light having a controllable color; and wherein the command signals comprise color command signals.

21. The method according to claim 19 wherein the at least one light comprises at least one light having a controllable intensity; and wherein the command signals comprise intensity command signals.

22. The method according to claim 19 wherein the power and command signals comprise a power signal and at least one command signal modulated thereon.

23. The method according to claim 19 comprising a water-resistant housing containing the second inductive member and second controller.

24. The method according to claim 23 wherein the water-resistant housing comprises:
- a bottom; and
- a translucent cover coupled to the bottom.

25. The method according to claim 23 wherein the water-resistant housing comprises:
- a translucent bottom; and
- an opaque cover coupled to the translucent bottom so that a peripheral ring thereof is exposed.

\* \* \* \* \*